United States Patent [19]

Wolf et al.

[11] Patent Number: 4,994,652
[45] Date of Patent: Feb. 19, 1991

[54] DEVICE FOR CONTROLLING THE HEATING OUTPUT OF THE HEATING ELEMENT OF A COOKING OR HEATING PLATE

[75] Inventors: Kurt Wolf; Wolfram Andre, both of Wildbad, Fed. Rep. of Germany

[73] Assignee: Fissler GmbH, Fed. Rep. of Germany

[21] Appl. No.: 335,625

[22] Filed: Apr. 10, 1989

[30] Foreign Application Priority Data

Apr. 9, 1988 [DE] Fed. Rep. of Germany ....... 3811925

[51] Int. Cl.$^5$ .............................................. H05B 1/00
[52] U.S. Cl. .................................. 219/497; 219/483; 219/486; 219/508; 99/325; 99/328
[58] Field of Search ............... 219/445, 449, 451, 450, 219/483, 486, 508, 509, 494, 497, 501, 506; 99/325, 328, 329 R

[56] References Cited

U.S. PATENT DOCUMENTS

| 4,345,145 | 8/1982 | Norwood | 219/492 |
|---|---|---|---|
| 4,572,935 | 2/1986 | Karino | 99/325 |
| 4,601,004 | 7/1986 | Hoh et al. | 99/328 |
| 4,634,843 | 1/1987 | Payne | 219/448 |
| 4,668,856 | 5/1987 | Axelson | 219/497 |

FOREIGN PATENT DOCUMENTS

| 0050240 | 9/1981 | European Pat. Off. . |
| 0074108 | 9/1982 | European Pat. Off. . |
| 0187629 | 12/1985 | European Pat. Off. . |
| 3238769 | 4/1984 | Fed. Rep. of Germany . |
| 3329300 | 2/1985 | Fed. Rep. of Germany . |
| 3342416 | 4/1985 | Fed. Rep. of Germany . |
| 3338788 | 5/1985 | Fed. Rep. of Germany . |
| 3533353 | 9/1986 | Fed. Rep. of Germany . |
| 3538353 | 9/1986 | Fed. Rep. of Germany . |

Primary Examiner—M. H. Paschall
Attorney, Agent, or Firm—Thomas W. Speckman; Douglas H. Pauley

[57] ABSTRACT

A control device for controlling the heating capacity of the heating element of a cooking or heating plate, on which a cooking vessel, roasting vessel, or the like, can be placed and heated. The temperature on or in the cooking vessel is determined by means of a temperature sensor, conveyed to a logic circuit, and used in this for the control of the heating element by means of an output stage in dependence on the actual temperature determined and/or the temperature increase in the heating phase. In order for control of the heating output of the heating element to also be performed during a roasting process with a roasting pan placed on the cooking or heating plate, a program selection switch provided to select between various cooking processes, such as rapid simmering, steaming, warming and the like has a coordinated switching position for each and for a roasting process has an additional switching position. The heating output is controlled during the heating phase by means of preset programs of the logic circuit by switching the heating element on and off by means of the output stage in dependence on the actual temperature detected by means of the temperature sensor and/or the temperature increase detected from the temperature curve.

15 Claims, 1 Drawing Sheet

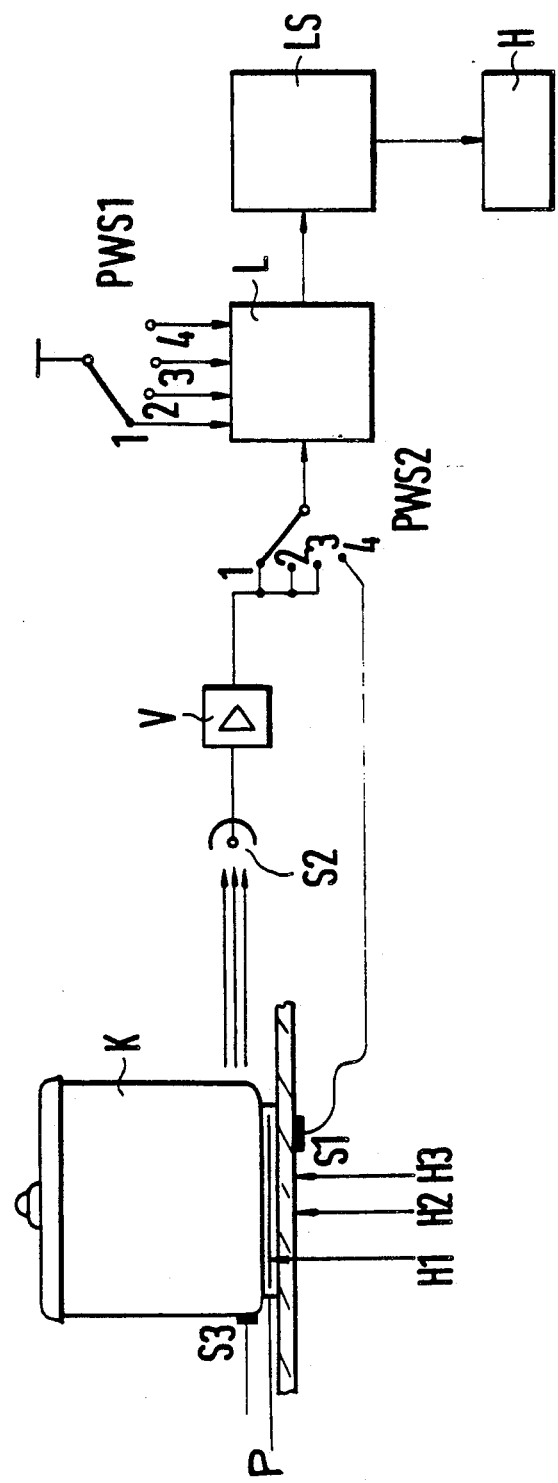

DEVICE FOR CONTROLLING THE HEATING OUTPUT OF THE HEATING ELEMENT OF A COOKING OR HEATING PLATE

BACKGROUND OF THE INVENTION

1. Field Of The Invention

This invention relates to a device for controlling the heating capacity of the heating element of a cooking or heating plate on which a cooking vessel, roasting vessel, or the like, can be placed and heated. The temperature on or in the cooking vessel is determined by means of a temperature sensor and conveyed to a logic circuit and used by the logic circuit to control the heating element by means of an output stage dependent on the actual temperature determined and/or the temperature increase determined during the heating phase.

2. Description Of The Prior Art

A device of this general type is known from German Patents DE-PS 33 38 788 and DE-PS 33 42 416. In these devices, the detection of the actual temperature on the cooking vessel can take place by means of a temperature sensor, which is constructed as a temperature-dependent resistor, and is maintained in heat-conducting contact with the external side of the container wall of the cooking vessel, as German Patent publication DE-OS 32 38 769 depicts. It is, however, also possible to detect the actual temperature of the cooking vessel, that is to say, that of the cooking material in the cooking vessel, by means of an irradiation receiver, which receives the waves irradiated from the vessel wall, and converts these into an electrical temperature signal characterizing the actual temperature, as German Patent DE-PS 35 38 353 depicts. In both cases, the control of the heating capacity is thereby adjusted to a certain temperature in or on the cooking vessel. This type of detection of the actual temperature and its use for the control of the heat output of the heating element is then optimal if various cooking processes, such as rapid cooking, steaming or warming are carried out, and there is used for that purpose a cooking vessel, as well as, among others, a steam pressure cooking container, which is placed on the cooking or heating plate, and is heated thereby.

In contrast to cooking in which the steam arising during the heating of the foods plays a decisive role, during the process of roasting a heating of the roasting material on a more or less thin layer of fat or oil takes place. Also, a so-called "fat-free" roasting is common.

SUMMARY OF THE INVENTION

A control must therefore relate to the temperature on the surface of the pan bottom if it is to detect the processes in a roasting material. The next most accessible point which is suited for the placing of a temperature sensor is the lower side of the heating or cooking plate, the heat conductivity or irradiation permeability of which is known and constant.

It is an object of this invention to so construct the device for controlling the heating output of the heating element of a cooking or heating plate of the type stated above that, upon reaching a control of the heating output of the heating elements to a predetermined roasting temperature, the most varied roasting pans can be placed on the cooking or heating plate and can be used for the roasting process.

This object is achieved, in accordance with the invention, through the fact that a program selecting switch is provided which, for various cooking processes, such as rapid cooking, steaming, warming and the like has one coordinated switching position provided for each of these, and an additional switching position provided for a roasting process. In addition, by means of a sensor, the actual temperature in the area of the cooking plate can be detected. In the switching positions of the program selection switch for the various cooking processes the temperature signal of a cooking temperature sensor and, in the switching position for the roasting process the temperature signal of a roasting temperature sensor can be conveyed to and can be evaluated within the logic circuit. The heating output can be controlled by means of predetermined programs of the logic circuit by switching the heating element on and off by means of the output stage in dependence upon the actual temperature detected by means of the temperature sensor and/or of the temperature increase in the heating phase determined from the temperature curve.

By means of the additional roasting temperature sensor, the roasting process can be adjusted to a predetermined roasting temperature. Through this means, the regulation precision which can be attained through the detection of the actual temperature suffices entirely. The program selection switch tells the logic circuit the selected operation—either rapid cooking, steaming, warming or roasting—so that the logic circuit takes the temperature signal for the single control process from the cooking temperature detected and, on the other hand, from the roasting sensor.

The cooking or heating plate can thereby be heated by means of a heating coil, by means of halogen lamps or by means of an induction coil, whereby the latter is positioned beneath the cooking or heating plate constructed as a ceramic plate.

The detection of the actual temperature during the cooking process by means of the temperature sensor can, in accordance with one construction, take place in such a manner that the temperature sensor is constructed as a temperature-dependent resistor which is maintained in heat-conducting contact with the cooking vessel positioned in the transition area between the container bottom and the container wall and derives a resistance value characterizing actual temperature, or that the temperature sensor is an irradiation receiver which receives the waves irradiated from the container wall of the cooking vessel, and converts such measurement into an electrical temperature signal characterizing the actual temperature.

For the detection of the actual temperature during the roasting process, it is, on the other hand, provided that the sensor, as a temperature-dependent resistor, is maintained in heat-conducting contact outside the irradiation field of the heating coils with the lower side of the cooking or heating plate, or that the sensor is positioned in heat-conducting contact with the lower side of the cooking or heating plate outside the irradiation field of the halogen lamps.

One construction provides switching of the temperature sensor connection with the logic circuit by means of a switching path coordinated with a program selection switch, whereby the logic circuit may be switched to the various cooking processes and the cooking temperature sensor may be switched to connect with the logic circuit, while the roasting sensor may be connected with the logic circuit when in the logic circuit switching position is coordinated to the roasting process.

The selection of the temperature signals can, however, also be undertaken by the logic circuit itself, if it is provided that the cooking temperature sensor and the roasting sensor are connected with separate inlets to the logic circuit and the program selecting switch, in the various switching positions, conveys to the logic circuit individual signals characterizing the cooking process or the roasting process and the logic circuit, in dependence on this signal, correspondingly selects the temperature signal of the corresponding temperature sensor and passes the output to an output stage. Through this means, the data for the selected cooking or roasting process becomes operative through the fact that, control programs of the logic circuit can be selected through the individual signals of the program selection switch.

BRIEF DESCRIPTION OF THE DRAWINGS

The invention will be illustrated in greater detail by means of a schematic circuit diagram shown in the drawing.

DESCRIPTION OF PREFERRED EMBODIMENTS

The cooking vessel (K) sits on the cooking or heating plate (P), which can be heated up by means of the various heating elements (H). The heating element (H1) indicated is an induction coil positioned beneath the cooking or heating plate (P). The cooking vessel must have a plate in the container bottom which can be heated by means of the currents thus induced. As the heating elements (H2 and H3) indicate, the heating plate (P) can also be heated up directly by means of heating coils or halogen lamps, whereby, in the latter case, the cooking or heating plate (P) is heated by means of irradiation.

During the cooking processes, the cooking vessel (K) may be among other types, also used as a steam pressure cooking vessel, which is placed on the cooking or heating plate (P). The detection of the actual temperature of the cooking material in the cooking vessel (K) can take place by means of a temperature sensor (S3) which is constructed as a temperature-dependent resistor maintained in heat-conducting contact with the external wall of the cooking vessel (K). For the temperature sensor (S2), however, an irradiation receiver may also be used, which absorbs the waves irradiated from the container wall of the cooking vessel (K), and converts these into an electrical temperature signal characterizing the actual temperature, which signal is amplified by means of the amplifier (V) which is connected in series. By the temperature signal of the temperature sensor (S2 or S3), a temperature drop may be measured through the container wall of the cooking vessel (K), so that the temperature signal of the temperature sensor (S2 or S3) can be directly related to the actual temperature of the cooking material in the cooking vessel (K). In the temperature sensor (S3), the resistance value changes in dependence on the actual temperature.

Below the cooking or heating plate (P) is positioned an additional sensor (S1), which is maintained in heat-conducting contact with, for example, the lower side of the cooking or heating plate (P), but outside the irradiation field of the heating element (H3) equipped with halogen lamps, or lies outside the irradiation field of the heating coils of the heating element (H2).

For the selection of the type of operation, a program selection switch with two switching paths (PWS1 and PWS2) is provided with four switching positions (1 to 4) each. Through this means, the switching positions (1 to 3) are coordinated with the various cooking processes, such as rapid cooking, steaming, and warming, while the switch position (4) is coordinated with the roasting process. By means of the switching path (PWS1), a signal characterizing the type of operation is conveyed to the logic circuit (L) so that the corresponding control program is selected therein to correspondingly control the output stage (LS). The output stage (LS) switches the heating element (H) on and off, in order to adjust the actual temperature to the temperature predetermined for the cooking process or roasting process selected. For the control process, the actual temperature must be conveyed to the logic circuit (L). It is now provided that the switching path (PWS2) of the program selection switch, in the switching positions (1 to 3) which are coordinated with the various cooking processes, switches the temperature sensor (S2 or S3) through to the logic circuit (L), whereas, during the roasting process in the switching position (4), the sensor (S1) is switched through to the logic circuit (L). The actual temperature is, during the cooking processes, therefore detected in or on the cooking vessel (K), whereas, during the roasting process it is detected, by means of the additional sensor (S1), in the area of the cooking or heating plate (P). The sensor (S1) can be constructed as a temperature-dependent resistor, which is maintained outside the irradiation field of the heating coil (H2) or outside the irradiation field of the halogen lamps used as a heating element (H3) adjacent the lower side of the cooking or heating plate (P).

The temperature sensor (S2 or S3) and the sensor (S1) can also be switched to two separate inlets of the logic circuit (L). Only the type of operation is conveyed to the logic circuit (L) through the switching path (PWS1). The logic circuit (L) then selects, corresponding to the type of operation selected, the temperature signal in the cooking processes from the temperature sensor (S2 or S3), and, during the roasting process, from the sensor (S1).

We claim:

1. A control device for controlling a heat output of a heating element of a heating plate, on which a cooking vessel may be placed and heated, in which a cooking vessel temperature of the cooking vessel is determined by means of a plurality of temperature sensors, conveyed to a logic circuit, and used in said logic circuit for the control of the heating element by means of an output stage which depends on an actual temperature determined and a temperature increase in a heating phase, said control device comprising:

a program selection switch (PWS1, PWS2) provided for selection of cooking processes for rapid cooking, steaming, and warming, for each of the cooking processes said program selection switch (PWS1, PWS2) has a coordinated switching position (1, 2, 3), and for a roasting process, said program selection switch (PWS1, PWS2) has an additional switching position (4);

a first sensor (S1) of said temperature sensors in an area of said heating plate (P) additionally detecting said actual temperature whereby said switching positions (1, 2, 3) of said program selection switch (PWS1, PWS2) coordinate the cooking processes the temperature signal of the temperature sensors (S2, S3) and, in the additional switching position (4) for the roasting process the temperature signal is conveyed from said first sensor (S1) of said temperature sensors to a logic circuit (L) for evaluation therein;

the heating output of the heating element (H) is controlled during the heating phase by means of preset programs of said logic circuit (L) by switching element (H) on and off by means of the output stage (LS) depending on the actual temperature detected by means of at least one of the cooking temperature sensors (S2, S3) and said first sensor (S1).

2. A control device in accordance with claim 1 wherein said heating plate (P) is heated by means of heating coil (H1).

3. A control device in accordance with claim 1 wherein said heating plate (P) is heated by means of halogen lamps (H2).

4. A control device in accordance with claim 1 wherein said cooking vessel (K) is heated by means of an induction coil, which is positioned below said heating plate (P) constructed as a ceramic plate.

5. A control device in accordance with claim 1 wherein a second sensor (S3) of said temperature sensors is a temperature-dependent resistor maintained in heat-conducting contact with said cooking vessel and positioned in a transition area between a vessel bottom and a vessel wall, and provides a resistance value characterizing the actual temperature.

6. A control device in accordance with claim 1 wherein a second sensor (S2) of said temperature sensors is an irradiation receiver which receives waves irradiated from a wall of said cooking vessel and converts the waves into an electrical temperature signal characterizing the actual temperature.

7. A control device in accordance with claim 1 wherein said first sensor (S1) is a temperature-dependent resistor maintained in heat-conducting contact with a lower side of said heating plate (P) outside of an irradiation field of any resistance heater.

8. A control device in accordance with claim 1 wherein said first sensor (S1) is a temperature; dependent resistor maintained in heating-conducting contact with a lower side of the heating plate (P) outside an irradiation field of halogen lamps used for heating.

9. A control device in accordance with claim 1 wherein said temperature sensors (S2, S3) and said first sensor (S1) are connected with said logic circuit (L) by means of a switching path of said program selection switch (PWS2) whereby a switching path in the switching positions (1, 2, 3) are coordinated with the cooking processes and connects one of said temperature sensors (S2, S3) with said logic circuit (L), whereas the additional switching position (4) is coordinated with the roasting process and connects said sensor (S1) with said logic circuit (L).

10. A control device in accordance with claim 1 wherein said temperature sensors (S2, S3) and said first sensor (S1) are connected with separate inlets to said logic circuit (L); said program selection switch (PWS1), in said switching positions (1, 2, 3) and said additional switching position (4) conveys individual signals characterizing at least one of the cooking process and the roasting process to said logic circuit (L); and said logic circuit (L), depending on said signals selects a corresponding temperature signal of at least one of said cooking temperature sensors (S2, S3) and of said first sensor (S1) for control of said output stage (LS).

11. A control device in accordance with claim 10 wherein said corresponding control programs of said logic circuit (L) can be selected with said individual signals of said program selecting switch (PWS1).

12. A control device in accordance with claim 1 wherein said temperature sensors (S2, S3) and said first sensor (S1) are connected with said logic circuit (L) by means of a switching path of said program selection switch (PWS2) whereby the switching path in the switching positions (1, 2, 3) are coordinated with the cooking processes and connects one of said temperature sensors (S2, S3) with said logic circuit (L), whereas the additional switching position (4) is coordinated with the roasting process and connects said first sensor (S1) with said logic circuit (L), said first sensor (S1) is a temperature-dependent resistor maintained in heat-conducting contact with a lower side of said heating plate (P) outside of an irradiation field of any resistance heater.

13. A control device in accordance with claim 1 wherein said temperature sensors (S2, S3) and said first sensor (S1) are connected with said logic circuit (L) by means of a switching path of said program selection switch (PWS2) whereby the switching path in the switching positions (1, 2, 3) are coordinated with the cooking processes and connects one of said temperature sensors (S2, S3) with said logic circuit (L), whereas the additional switching position (4) is coordinated with the roasting process and connects said first sensor (S1) with said logic circuit (L), said first sensor (S1) is a temperature-dependent resistor maintained in heating-conducting contact with a lower side of the heating plate (P) outside an irradiation field of halogen lamps used for heating.

14. A control device in accordance with claim 1 wherein said temperature sensors (S2, S3) and said first sensor (S1) are connected with separate inlets to said logic circuit (L); said program selection switch (PWS1), in said switching positions (1, 2, 3) and said additional switching position (4) conveys individual signals characterizing at least one of the cooking process and the roasting process to said logic circuit (L); and said logic circuit (L), depending on said signals selects a corresponding temperature signal of at least one of said temperature sensors (S2, S3) and of said first sensor (S1) for control of said output stage (LS), said first sensor (S1) is a temperature-dependent resistor maintained in heat-conducting contact with a lower side of said heating plate (P) outside of an irradiation field of any resistance heater.

15. A control device in accordance with claim 1 wherein said temperature sensors (S2, S3) and said first sensor (S1) are connected with separate inlets to said logic circuit (L); said program selection switch (PWS1), in said switching positions (1, 2, 3) and said additional switching position (4) conveys individual signals characterizing at least one of the cooking process and the roasting process to said logic circuit (L); and said logic circuit (L), depending on said signals selects a corresponding temperature signal of at least one of said temperature sensors (S2, S3) and of said first sensor (S1) for control of said output stage (LS), and said first sensor (S1) is a temperature dependent resistor maintained in heating-conducting contact with a lower side of the heating plate (P) outside of an irradiation field of halogen lamps used for heating.

* * * * *